(12) United States Patent
Sellmer et al.

(10) Patent No.: US 11,934,158 B2
(45) Date of Patent: Mar. 19, 2024

(54) PROVIDING OPERATING PARAMETERS OF AN AUTOMATION DEVICE

(71) Applicant: SICK STEGMANN GMBH, Donaueschingen (DE)

(72) Inventors: Christian Sellmer, Donaueschingen (DE); David Hopp, Donaueschingen (DE); Simon Brugger, Lenzkirch (DE); Frank Wurdig, Donaueschingen (DE)

(73) Assignee: SICK AG, Waldkirch (DE)

( * ) Notice: Subject to any disclaimer, the term of this patent is extended or adjusted under 35 U.S.C. 154(b) by 462 days.

(21) Appl. No.: 16/800,488

(22) Filed: Feb. 25, 2020

(65) Prior Publication Data
US 2020/0272113 A1 Aug. 27, 2020

(30) Foreign Application Priority Data
Feb. 26, 2019 (EP) .................................. 19159453

(51) Int. Cl.
*G05B 13/04* (2006.01)
*H04L 67/125* (2022.01)

(52) U.S. Cl.
CPC .......... *G05B 13/042* (2013.01); *H04L 67/125* (2013.01)

(58) Field of Classification Search
CPC .............. G05B 13/042; G05B 19/0426; G05B 19/41865; G05B 2219/25257; G05B 2219/32252; H04L 67/125
See application file for complete search history.

(56) References Cited

U.S. PATENT DOCUMENTS

| | | | | |
|---|---|---|---|---|
| 2002/0016647 A1* | 2/2002 | Bourne | .............. | G05B 19/4069 700/165 |
| 2009/0249849 A1* | 10/2009 | Martin | .................... | B21B 37/28 72/9.1 |
| 2015/0266071 A1* | 9/2015 | Sexton | .................... | B21B 1/166 72/7.1 |
| 2017/0139391 A1* | 5/2017 | Yamamoto | ......... | G05B 19/0428 |
| 2020/0094303 A1* | 3/2020 | Smith | .................. | B21D 19/043 |

FOREIGN PATENT DOCUMENTS

| | | |
|---|---|---|
| CN | 105785918 A | 7/2016 |
| DE | 102016000100 A1 | 7/2016 |
| DE | 102016121145 A1 | 5/2017 |
| EP | 2299341 A1 | 9/2009 |
| EP | 2299341 A1 | 3/2011 |

OTHER PUBLICATIONS

Search Report dated Jul. 15, 2019 issued in corresponding European Application No. 19159453.0.

* cited by examiner

*Primary Examiner* — Kidest Bahta
(74) *Attorney, Agent, or Firm* — Nath, Goldberg & Meyer; Jerald L. Meyer; Stanley N. Protigal

(57) ABSTRACT

A method of providing operating parameters of an automation device via a configuration system comprising:
detection of a pre-selection of the automation device via a user interface of the configuration system;
detection of a target value of a first operating parameter of the automation device via the user interface;
calculation of a limit value of a second operating parameter of the automation device in dependence on the target value of the first operating parameter, wherein the dependence of the second operating parameter on the first operating parameter is calculated using a device model of the automation device; and (Continued)

output of the limit value of the second operating parameter via the user interface of the configuration system.

19 Claims, 2 Drawing Sheets

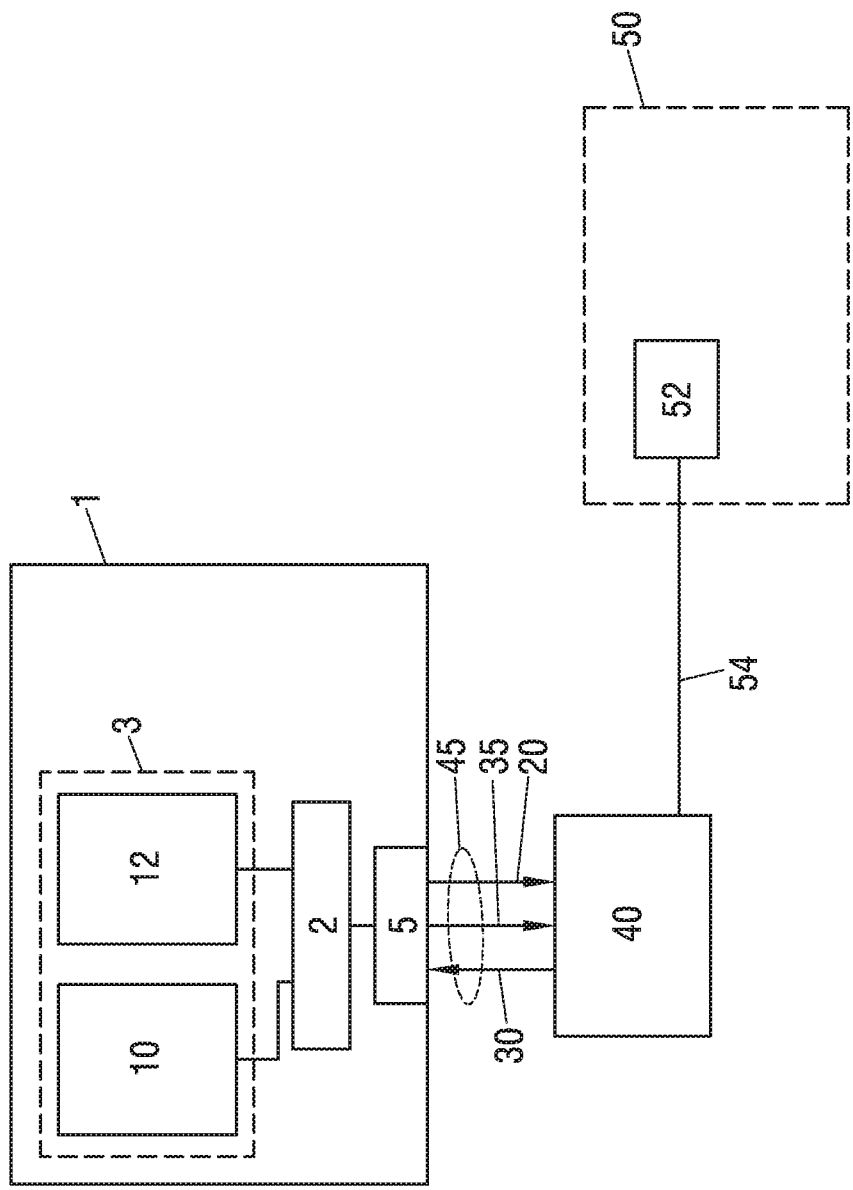

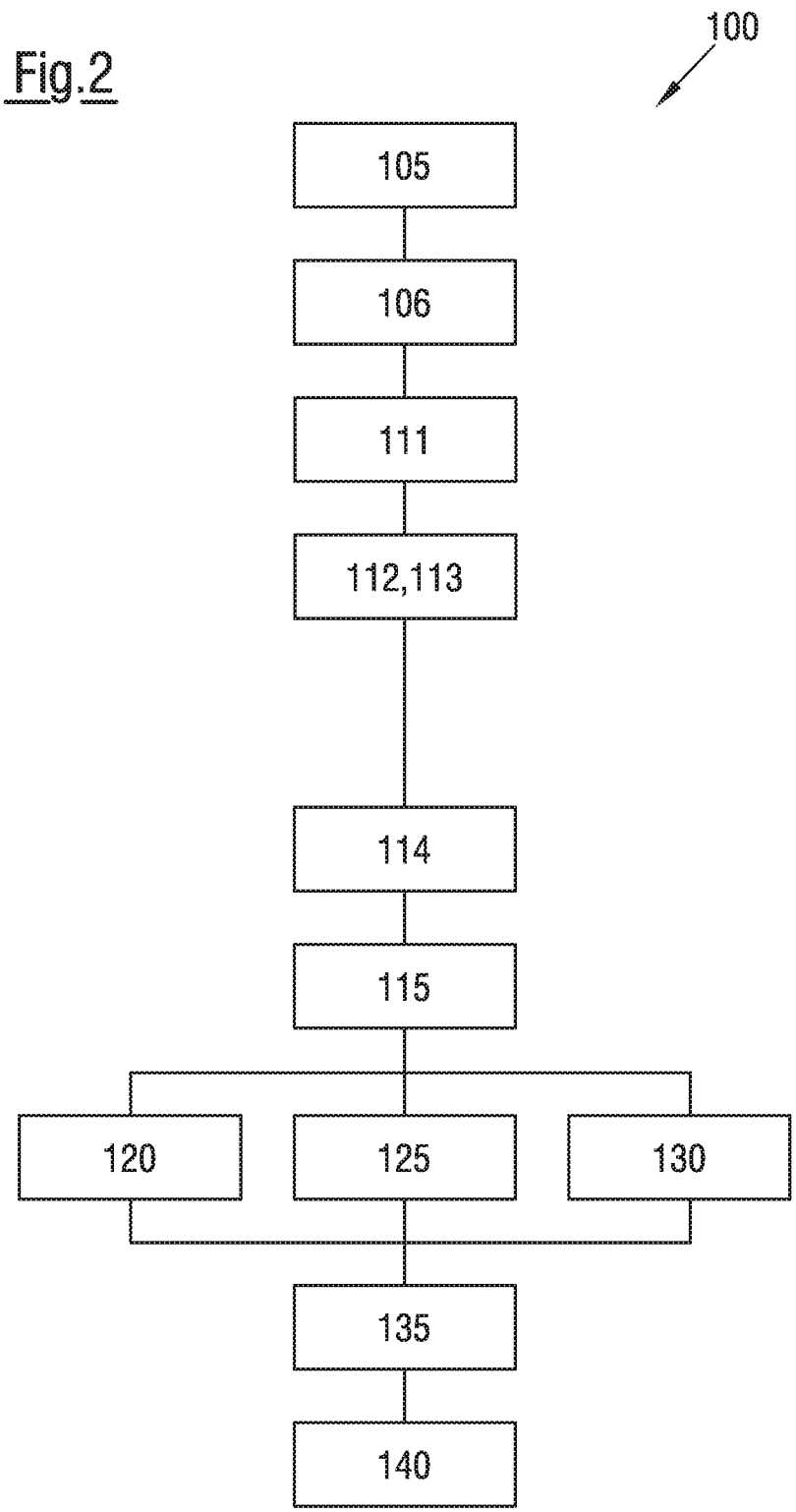

PROVIDING OPERATING PARAMETERS OF AN AUTOMATION DEVICE

FIELD

The present invention relates to a method of providing operating parameters of an automation device.

BACKGROUND

Automation devices are used in automation systems to control or regulate automated processes. Such automation devices can inter glia be actuators to influence the automation process, sensors to detect a state of the automation process, or control units to process input signals of the sensors and to generate output signals for the actuators.

It is necessary in the planning and configuration of automation systems to select automation devices that are suitable for the operating conditions of the planned automation process. The operating conditions in particular have to be within specified limit values of operating parameters of the selected automation devices, The operating parameters, for example, indicate environmental conditions under which the automation device can be used, electrical characteristics of the input and output signals processed by the automation devices, for example voltage ranges or noise values, or error limits in the detection of input values or in the output of output values.

The operating parameters of the automation devices typically mutually influence one another. The limit values of the individual operating parameters are therefore as a rule respectively specified by the manufacturer of the automation device and are set down in the data sheets of the automation devices such that the limit values of the individual operating parameters are valid over the total specified parameter ranges of the other operating parameters. This ensures that the automation device can also still be used under operating conditions in which the parameter values of a plurality of or of all of the operating parameters adopt their respective specified limit values.

SUMMARY

It is the object of the invention to provide a method that enables a selection of an automation device for an automation process that meets the demands and that is flexible.

This object is satisfied by a method in accordance with the independent claim. Further developments are specified in the dependent claims.

The method disclosed herein for providing operating parameters of an automation device via a configuration system in particular comprises a
  detection of a pre-selection of the automation device via a user interface of the configuration system;
  detection of a target value of a first operating parameter of the automation device via the user interface;
  calculation of a limit value of a second operating parameter of the automation device in dependence on the target value of the first operating parameter, wherein the dependence of the second operating parameter on the first operating parameter is calculated using a device model of the automation device; and
  output of the limit value of the second operating parameter via the user interface of the configuration system.

It has been recognized within the framework of the invention that a selection of the automation device that meets the demands and is flexible is made possible in that no rigid value that is valid over a whole permitted parameter range of the first operating parameter is specified as the limit value of the second operating parameter, but rather a variable limit value that is calculated in an automated manner by the configuration system in dependence on a predefined target value of the first operating parameter. This makes it possible, for example, to specify particularly large or small target values of the first operating parameter, with the limit value of the second operating parameter in turn being limited in its calculation such that the automation device remains operable overall.

It can, for example, be calculated in accordance with the invention that an encoder provided for the use has measurement noise that is below a target value predefined by the user as long as a maximum value of an operating temperature is not exceeded. The measurement noise here represents the first operating parameter, the operating temperature the second operating parameter, and the maximum value of the operating temperature the calculated limit value of the second operating parameter. The maximum value of the measurement noise specified by the user can be considerably smaller than predefined as standard in the data sheet of the encoder since the measurement noise specified as standard relates to much higher operating temperatures.

An advantage thus achieved is that e.g. a more expensive or more exact encoder can be dispensed with since it can be determined that the planned encoder can also be used at the planned deployment temperature and nevertheless delivers the desired low measurement noise.

A parameter range of the first operating parameter defined by the target value of the first operating parameter can in particular be selectively widened via the user interface and a parameter range of the second operating parameter defined by the limit value of the second operating parameter can in turn be restricted. This enables a specification of the automation device specific to the application. As a result, parameter values of the first and second operating parameters can be output via the user interface in the form of an application-specific data sheet of the automation device (for example as a PDF file).

Although only the first operating parameter and the second operating parameter are mentioned above, a plurality of first operating parameters can also be predefined within the framework of the method, as will be explained in the following, and/or the second operating parameter or a plurality of second operating parameters can be calculated in dependence on the first operating parameter or on the plurality of first operating parameters.

After the calculation of the limit value of the second operating parameter, the method can additionally comprise a providing of configuration data that comprise the target value of the first operating parameter and/or the limit value of the second operating parameter and are stored in the automation device for configuration. The method can additionally include a connection of the automation device to an automation system to control an automation process, in particular after a configuration using the configuration data provided via the user interface.

The automation device can, for example, be configured as a sensor, an actuator, or a control device. The automation device can preferably be configured to be linked to the automation system and to be connected to further automation devices via a data line, in particular a fieldbus.

The automation device can be configured as a sensor, in particular as an encoder, for instance as a motor encoder. The first or second operating parameter can in particular be an environmental temperature or a device temperature and the respective other operating parameter can be electronic noise or a measurement imprecision of a sensor signal output by the sensor. The first or second operating parameter can also be a service life and the respective other operating parameter can be an operating variable of the automation device, in particular a speed of rotation, a downtime, a repeated load, a degree of contamination, or similar. The first or second operating parameter can also be a device tolerance, for example with respect to an eccentricity on connection to a motor shaft, and the respective other operating parameter can be an error value of the output sensor signal. All other combinations of said parameters are furthermore also possible.

The configuration system can be configured as a data processing system, for example as a web server. The user interface can, for example, be configured as a website interface to which a user device, for example a further data processing unit, can be connected via a data connection. Access to the website interface can take place by the user device, for example by means of a web browser. The user interface can, however, also comprise an input unit and an output unit, in particular a screen, that are directly connected to the configuration system. The configuration system can in particular be arranged at a manufacturer of the automation device and the user device at a customer of the manufacturer.

The calculation of the limit value of the second operating parameter can take place on the configuration system. The device model can equally be stored on the configuration system, for example in a storage unit of the configuration system. The configuration system can furthermore comprise a stored control program to carry out the method.

The configuration system can be configured first to display a plurality of automation devices, for example a plurality of automation devices of the same device type, for pre-selection, for example in a list, via the user interface. A user input via the user interface by means of which one of the displayed automation devices is selected can be detected as the pre-selection.

The configuration system can furthermore be configured to present a graphical representation of a set parameter value of the first operating parameter, for example in the form of a slide control, via the user interface and to modify the presentation on a change of the set parameter value via the user interface. The parameter value of the first operating parameter set at the time of detection of the target value can then be taken over as the target value. The configuration system can be configured to continuously detect the target value of the first operating parameter and to continuously output the calculated limit value of the second operating parameter via the user interface so that an immediate change of the limit value of the second operating parameter is presented on a change of the set parameter value of the first operating parameter.

The limit value of the second operating parameter can be output via the user interface in the form of a numerical value or as a graphical representation, for example likewise as a slide control.

In accordance with an embodiment, a parameter value of the second operating parameter desired by the user can also be set or input at the user interface in addition to the target value of the first operating parameter. The user can in this manner e.g. specify that the automation device should be operated at a temperature of a maximum of 40° C. The temperature here corresponds to the target value of the first operating parameter. A measurement accuracy or angular resolution of e.g. 0.001° is desired at a temperature of a maximum of 40° C. The desired measurement accuracy corresponds to the desired parameter value of the second operating parameter.

The limit value of the second operating parameter can then, for example, be output in that it is compared with the (desired) parameter value of the second operating parameter set via the user interface and an impermissible deviation of the set (desired) parameter value from the calculated limit value of the second operating parameter is displayed via the user interface. This can in particular be the case when a measurement accuracy of 0.05° can be achieved as a maximum at the input maximum temperature of 40° C. The impermissible deviation can then e.g. be displayed by a red marking or by a corresponding error message.

In addition to the detection of the target value of the first operating parameter of the automation device, the method can also comprise a detection of further target values of further first operating parameters of the automation device and the limit value of the second operating parameter can additionally be calculated in dependence on the further target values. Analogously, the method can comprise a calculation and output of further limit values of further second operating parameters in dependence on the target values of the first operating parameters in addition to the calculation and output of the limit value of the second operating parameter. In this respect, the dependencies of the second operating parameters on the first operating parameters can be stored in the device model of the automation devices.

The limit value of the second operating parameter can be output, for example be provided for download, via the user interface in the form of a data sheet of the automation device. The data sheet can also include the target value of the first operating parameter and/or parameter values of further operating parameters in addition to the limit value of the second operating parameter. The limit value of the second operating parameter and/or the target value of the first operating parameter can, for example, each be output as limit values of parameter ranges of the first operating parameter or of the second operating parameter specified as permissible. The data sheet can additionally include general information on the automation device.

The limit value of the second operating parameter can be calculated with reference to the device model such that a characteristic of the automation device is within a permissible value range when the automation device is operated with the target parameter of the first operating parameter and with the limit value of the second operating parameter. The characteristic of the automation device can, for example, be a device temperature, a power consumption, a measurement resolution, or similar.

A further development of the method comprises a providing of configuration data that include the target value of the first operating parameter and/or the limit value of the second operating parameter for storage in the automation device. The automation device can thereby be configured particularly simply, in particular by an end customer. The configuration data can, for example, comprise configuration parameters, for example a measurement resolution, for a control program to be carried out by the automation device in operation or safety parameters, for example a maximum temperature, whose observation is monitored by the automation device in operation.

A further development of the method comprises a connection of the automation device to an automation system to control an automation process and a storage of the configuration data in the automation device. It can thereby be ensured that the automation device is configured on installation into an automation process such that it observes a specification defined by the target value of the first operating parameter and the limit value of the second operating parameter. The automation process can in particular be an industrial automation process.

In a further development of the method, the detection of the target value of the first operating parameter comprises a reading of a measured value of the first operating parameter including the target value via the user interface. This enables a particularly simple input of the target value of the first operating parameter via the user interface.

A further development of the method comprises a measurement of the first operating parameter in an automation process to be connected to the automation device. The measurement can preferably be carried out where the automation device should later be positioned or used in the automation process, with the measurement being able to be made by a measurement device separate from the automation device. The measured first operating parameter can then preferably be automatically processed, whereby the limit value of the second operating parameter can then likewise be automatically output. It can thereby be ensured in a particularly simple manner that the automation device is specified and selected such that it is suitable for the operating conditions actually present in the automation process.

A further development of the method comprises a detection of a selection of the first operating parameter via the user interface and a selection of the second operating parameter by the configuration system with reference to the device model and on the basis of the selected first operating parameter. It is thereby made possible to select the first operating parameter, whose target value is predefined for the specification of further operating parameters, flexibly and in a manner meeting demands. The first operating parameter can in particular be selected as an operating parameter at which a parameter value predefined within the framework of a basic specification is incompatible with the planned operating conditions of the automation device.

The method can analogously also comprise a selection of the second operating parameter in dependence on the selected first operating parameter and/or on the detected target value of the first operating parameter, with the second operating parameter being selected with reference to the stored device model of the automation device. This makes it possible to select and adapt the second operating parameter in an automated manner such that an operation of the automation device becomes possible at the target value of the first operating parameter. The method can furthermore comprise pre-selecting a plurality of second operating parameters in a corresponding manner in dependence on the selected first operating parameter and/or on the detected target value of the first operating parameter and displaying them via the user interface for a final selection.

In a further development of the method, the first and/or second operating parameter is/are environmental parameters of a deployment environment of the automation device, in particular an environmental temperature, an environmental humidity, an environmental vibration, an environmental shock, or similar.

In a further development of the method, the first and/or second operating parameter is/are configuration parameters of the automation device, in particular a measurement resolution, a measurement interval, a drive force, a drive torque, or similar. The configuration parameters can in particular be stored in the automation device and can be taken into account on a carrying out of the control program of the automation device.

In a further development of the method, the user interface is configured as a website interface. This enables particularly simple access to the configuration system, in particular from a spatial distance. The website interface can, for example, provide input masks and/or slide controls for predefining the first operating parameter and/or a simultaneous output of the second operating parameter.

In a further development of the method, the stored device model fixes the dependence of the second operating parameter on the first operating parameter in a multi-dimensional parameter space. The multi-dimensional parameter space can in particular comprise a plurality of mutually dependent operating parameters of the automation device.

In a further development of the method, the first and second operating parameters fix a working point of the automation device in the parameter space.

In a further development of the method, the device model comprises a list with mutually associated parameter values of the first and second operating parameters and/or a functional relationship between the first and second operating parameters. This enables a simple calculation of the second operating parameter. If the device model comprises the list of mutually associated parameter values, the limit value of the second operating parameter can be calculated in that the target value of the first operating parameter is looked for in the list or is interpolated on the list and the associated parameter value of the second operating parameter is output as the limit value. If the device model comprises the functional relationship, the second operating parameter can be calculated by evaluation of this relationship.

In a further development of the method, the device model comprises a simulation model of the automation device, with the simulation model preferably comprising the first and/or second operating parameters as input parameters. This makes it possible also to take account of complex relationships between the first and second operating parameters in the calculation. The second operating parameter can in particular be a starting parameter of the simulation model. The simulation model can reproduce and calculate the physical relationships in the automation device. The simulation program can also be called a "digital twin".

In a further development of the method, the limit value of the second operating parameter is calculated by means of a parameter optimization carried out using the simulation module while varying the second operating parameter. In this case, the second operating parameter can in particular be an input parameter of the simulation model. As part of the parameter optimization, a characteristic of the automation device, for instance the device temperature, can in particular be optimized as an optimization function such that it is within a predefined permitted value range.

A further development of the method comprises an output of a dependence of the second operating parameter and/or of a third operating parameter predefined by the device model on the first operating parameter via the user interface to present an operating behavior of the automation device. The behavior of the automation device can in particular be simulated during an operation under the environmental conditions predefined by the first operating parameter by outputting the dependence. The third operating parameter can in particular be the characteristic of the automation device that is observed in the parameter optimization carried out to calculate the second operating parameter. In addition, a variation of the second and/or third operating parameters can be output and shown via the user interface on a change of the target value of the first operating parameter.

The invention also relates to a configuration system to provide operating parameters of an automation device, wherein the configuration system comprises a user interface, a data processing unit connected to the user interface, and a storage unit connected to the data processing unit. The data processing unit is configured to detect a pre-selection of the automation device and a target value of a first operating parameter of the automation device via the user interface. The data processing unit is furthermore configured to calculate a limit value of a second operating parameter of the automation device in dependence on the target value of the first operating parameter, with the dependence of the second operating parameter on the first operating parameter being calculated using a device model of the automation device stored in the storage unit. The data processing unit is additionally configured to output the limit value of the second operating parameter via the user interface.

The configuration system is in particular configured to carry out the method in accordance with the invention. To this extent all the further developments and advantages that have been described in connection with the method in accordance with the invention also relate to the configuration system and vice versa. A control program that includes instructions on carrying out the method can be stored in the configuration system for carrying out the method in accordance with the invention.

BRIEF DESCRIPTION OF THE DRAWINGS

The invention will be explained in the following with reference to Figures. There are shown in a schematic representation in each case:

FIG. 1 a configuration system for providing operating parameters of an automation device; and FIG. 2 a method of providing operating parameters of an automation device via the configuration system.

DETAILED DESCRIPTION

FIG. 1 shows a configuration system 1 for the automated provision of operating parameters of an automation device, not shown. The configuration system 1 comprises a data processing unit 2 and a user interface 5 connected to the data processing unit 2. In addition, the configuration system 1 comprises a storage unit 3 that is connected to the data processing unit 2 and in which a device model 10 of the automation device and further device models 12 of further automation devices are stored.

A user device 40 is connected to the user interface 5 of the configuration system 1 via a data connection 45, in particular over the internet. The configuration system 1 detects a target value 30 of a first operating parameter of the automation device from the user device 40 via the user interface 5. In addition, the configuration system 1 transmits a limit value 35 of a second operating parameter of the automation device calculated in dependence on the target value via the user interface 5 to the user device 40 as well as configuration data 20 that comprise the target value 30 of the first operating parameter and the limit value 35 of the second operating parameter The user device 40 is furthermore connected to a sensor 52 that is in turn connected via a further data connection 54, in particular a fieldbus, to an automation process 50 in which the automation device is to be used. The user device 40 receives a measured value of the first operating parameter, that it subsequently transmits as the target value 30 to the configuration system 1, from the sensor 52 via the further data connection 54. The sensor 52 can be a sensor, for example a separate temperature sensor, different from the automation device whose operating parameters are to be provided.

FIG. 2 shows a method 100 of providing operating parameters of the automation device by the configuration system 1. The method 100 is in particular stored in a control program of the configuration system 1.

The method 100 comprises a detection 105 via the user interface 5 of a pre-selection of the automation device whose operating parameter are to be provided. The automation device is in particular selected from the automation devices whose device models 10, 12 are stored in the configuration system 1. The method 100 subsequently comprises a detection 106 via the user interface 5 of a selection of a first operating parameter whose parameter value is to be adapted by means of the target value 30. The first operating parameter is here selected from a plurality of operating parameters of the previously selected automation device.

The method 100 subsequently comprises a measurement 111 of the measured value of the first operating parameter by means of the sensor 52 and a detection 113 of the target value 30 of the first operating parameter via the user interface 5 of the configuration system 1 in that a reading 112 of the measured value takes place via the user interface 5. The method 100 additionally comprises a selection 114 of the second operating parameter with reference to the detected target value 30 of the first operating parameter.

The method 100 furthermore comprises a calculation 115 of the limit value 35 of the second operating parameter in dependence on the predefined target value 30 of the first operating parameter and an output 120 of the limit value 34 via the user interface 5. The method 100 additionally comprises a providing 125 of configuration data that comprise the target value 30 of the first operating parameter and the limit value 35 of the second operating parameter and an output 130 of a dependence of the second operating parameter on the first operating parameter. The providing 125 and the output 130 each take place via the user interface 5 here. Finally, the method 100 comprises a storage 140 of the output configuration data 20 in the automation device. The limit value 35 of the second operating parameter and the target value 30 of the first operating parameter are output in the form of a digital data sheet via the user interface 5.

REFERENCE NUMERAL LIST 1 configuration system
2 data processing unit
3 storage unit
5 user interface
10 device model
12 further device models
20 configuration data
30 target value
35 limit value
40 user device
45 data connection
50 industrial automation process
52 sensor
54 further data connection
51 first operating parameter
52 second operating parameter
100 method of providing operating parameters
105 detection of a pre-selection of the automation device 106 detection of a selection of a first operating parameter
111 measurement of a measured value
112 reading of a measured value
113 detection of a target value of a first operating parameter
114 selection of a second operating parameter
115 calculation of a limit value of a second operating parameter
120 output of a limit value
125 providing configuration data
130 output of a dependence
135 connection to an automation system
140 storage of configuration data

The invention claimed is:

1. A method of providing operating parameters of an automation device via a configuration system, the method comprising the following steps:
    detection of a pre-selection of the automation device via a user interface of the configuration system;
    detection of a target value of a first operating parameter of the automation device via the user interface;
    calculation of a limit value of a second operating parameter of the automation device in dependence on the target value of the first operating parameter,
    wherein the dependence of the second operating parameter on the first operating parameter is calculated using a device model of the automation device;
    output of the limit value of the second operating parameter via the user interface of the configuration system; and
    providing configuration data comprising at least one of the target value of the first operating parameter and the limit value of the second operating parameter for storage in the automation device,
    wherein the automation device is selected from the automation devices whose device models are stored in the configuration system,
    and wherein the limit value of the second operating parameter is calculated with reference to the device model such that a characteristic of the automation device is within a permissible value range when the automation device is operated to control or regulate automated processes with the target parameter of the first operating parameter and with the limit of the second operating parameter.

2. The method in accordance with claim 1, further comprising the steps of:
    connecting the automation device to an automation system to control an automation process; and
    storing the configuration data in the automation device.

3. The method in accordance with claim 1,
    wherein the detection of the target value of the first operating parameter comprises a reading of a measured value of the first operating parameter including the target value via the user interface.

4. The method in accordance with claim 3, further comprising the step of:
    measuring the first operating parameter in an automation process to be connected to the automation device.

5. The method in accordance with claim 1, further comprising the steps of:
    detection of a selection of the first operating parameter via the user interface; and
    selection of the second operating parameter by the configuration system with reference to the device model and on the basis of the selected first operating parameter.

6. The method in accordance with claim 1,
    wherein at least one of the first operating parameter and the second operating parameter is an environmental parameter of a deployment environment of the automation device.

7. The method in accordance with claim 6,
    wherein the environmental parameter is selected from the group of parameters consisting of an environmental temperature, an environmental humidity, an environmental vibration, and an environmental shock.

8. The method in accordance with claim 1,
    wherein at least one of the first operating parameter and the second operating parameter is a configuration parameter of the automation device.

9. The method in accordance with claim 8,
    wherein the configuration parameter is selected from the group of parameters consisting of a measurement resolution, a measurement interval, a drive force, and a drive torque.

10. The method in accordance with claim 1,
    wherein the user interface is configured as a website interface.

11. The method in accordance with claim 1, wherein the stored device model fixes the dependence of the second operating parameter on the first operating parameter in a multi-dimensional parameter space.

12. The method in accordance with claim 11,
    wherein the first and second operating parameters fix a working point of the automation device in the parameter space.

13. The method in accordance with claim 1,
    wherein the device model comprises a list with mutually associated parameter values of the first and second operating parameters.

14. The method in accordance with claim 1,
    wherein the device model comprises a functional relationship between the first and second operating parameters.

15. The method in accordance with claim 1,
    wherein the device model comprises a simulation model of the automation device.

16. The method in accordance with claim 15,
    wherein the simulation model comprises the first and/or second operating parameters as input parameters.

17. The method in accordance with claim 15,
    wherein the limit value of the second operating parameter is calculated by means of a parameter optimization carried out using the simulation module while varying the second operating parameter.

18. The method in accordance with claim 1, further comprising the step of:
    an output of a dependence of at least one of the second operating parameter and a third operating parameter predefined by the device model on the first operating parameter via the user interface to present an operating behavior of the automation device.

19. A configuration system to provide operating parameters of an automation device,
    wherein the configuration system comprises:
    a user interface;
    a data processing unit connected to the user interface; and
    a storage unit connected to the data processing unit,
    wherein the data processing unit is configured to detect a pre-selection of the automation device and a target value of a first operating parameter of the automation device via the user interface,
    wherein the data processing unit is configured to calculate a limit value of a second operating parameter of the automation device in dependence on the target value of the first operating parameter, with the dependence of the second operating parameter on the first operating parameter being calculated using a device model of the automation device stored in the storage unit, wherein the data processing unit is configured to output the limit value of the second operating parameter via the user interface, wherein the automation device is selected from the automation devices whose device models are stored in the configuration system, and wherein the limit value of the second operating parameter is calculated with reference to the device model such that a characteristic of the automation device is within a permissible value range when the automation device is operated to control or regulate automated processes with the target parameter of the first operating parameter and with the limit of the second operating parameter.

* * * * *